Patented Mar. 9, 1954

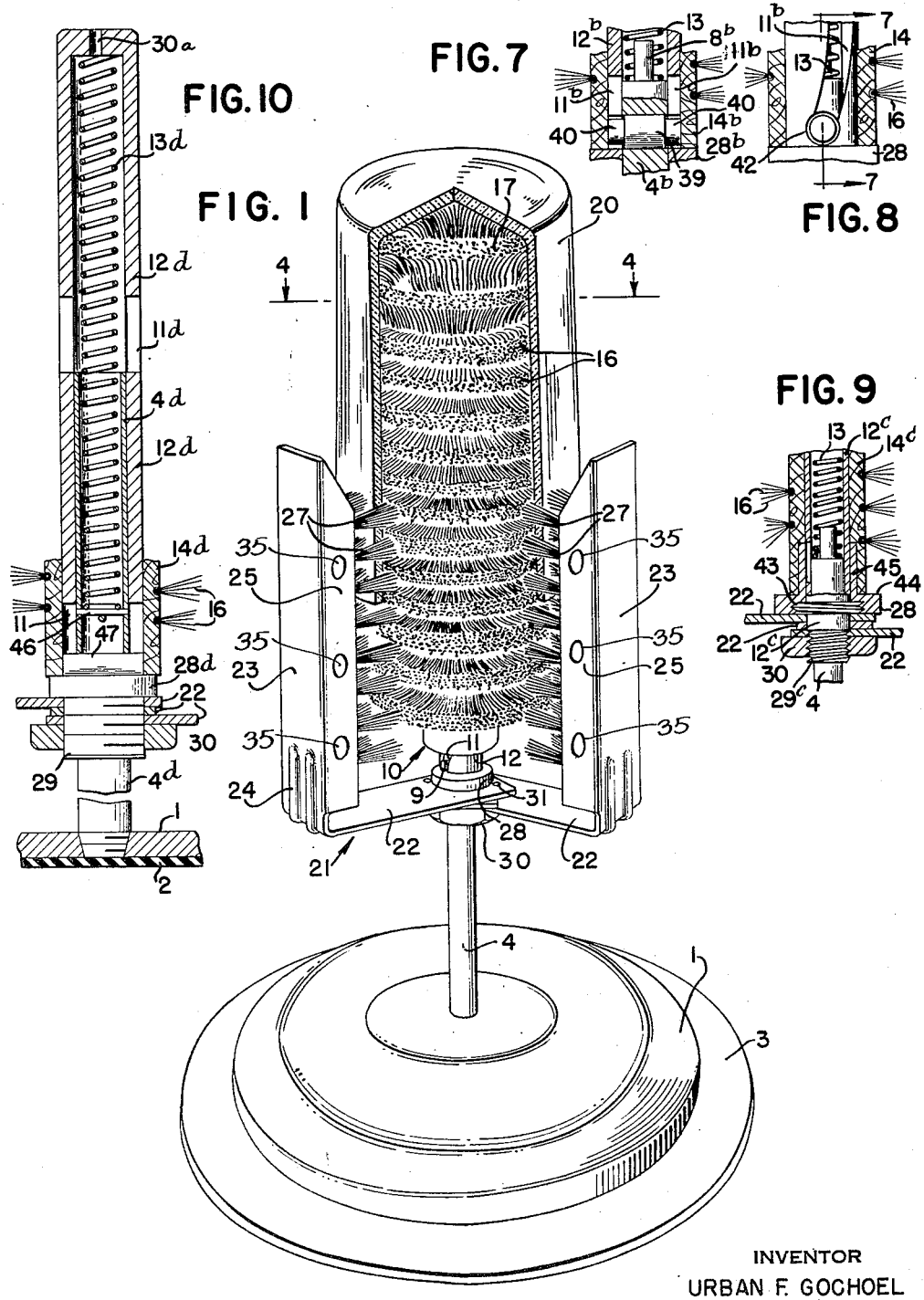

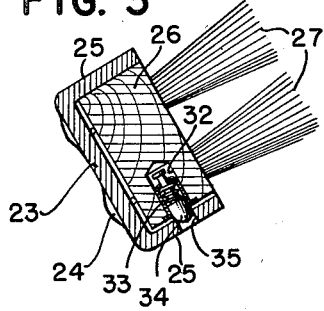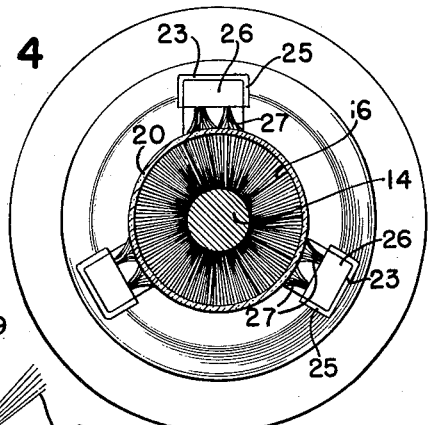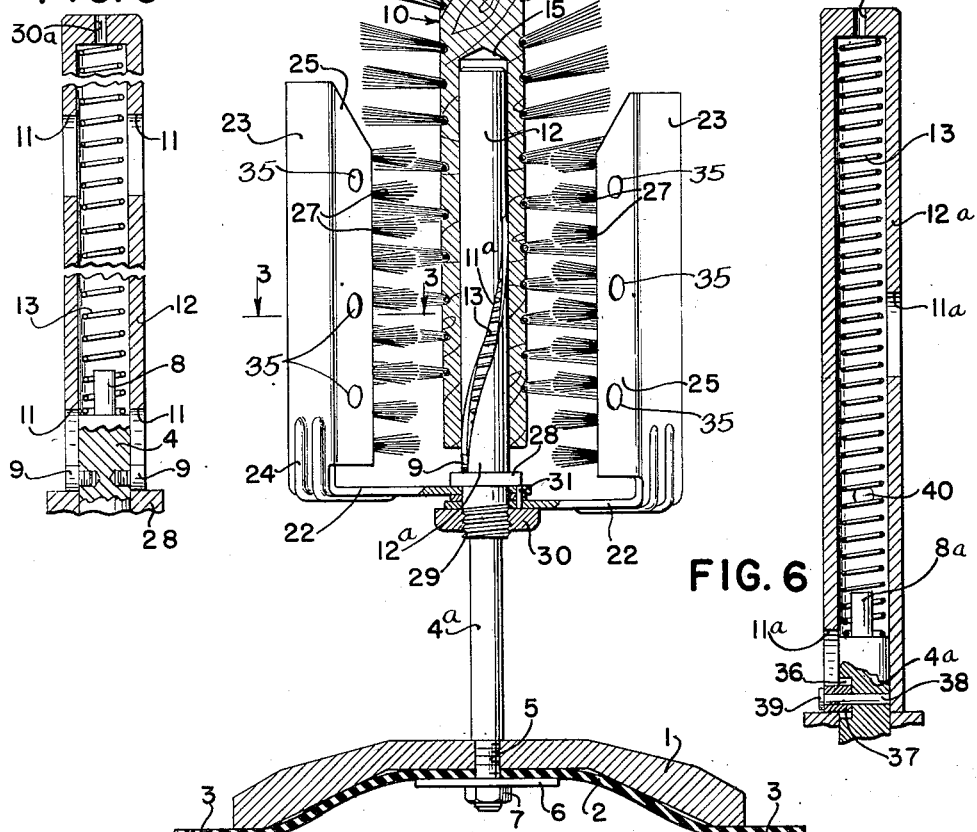

2,671,235

UNITED STATES PATENT OFFICE 2,671,235

RECIPROCABLE GLASS WASHER OF THE CENTRAL BRUSH ELEMENT AND OUTER BRUSH CARRIER TYPE

Urban F. Gochoel, Dayton, Ohio

Application July 30, 1947, Serial No. 764,664

5 Claims. (Cl. 15—76)

1

The present invention relates to glass and bottle washers, particularly those of the hand operated type employed in restaurants and beverage dispensing establishments.

Various kinds of glass washers have heretofore been employed, some of them using only high pressure jets of water and others employing brush arrangements. The water jet types are not altogether satisfactory in that little or no scouring action is obtained while the brush form of washer has been found to have an unduly complicated mechanical arrangement, tending to get out of order easily, and in any case not having the proper facilities for readily replacing the brushes as they become worn. Most, if not all, of the brush types of glass washers do not scour the entire surface on both sides of the glasses, including the bottom inside area so that the washed glass has not been rendered germicidically clean and free from deposits.

The primary object of the invention is to provide a hand operated washer for glasses, mugs, jugs, large mouth bottles and similar glass or crockery ware in which the washer is of simple manufacture, inexpensive, and has facility of assembly and replacement of parts.

Another object of the invention is to provide a glass or crockery washer employing brushes on the interior and exterior of the glass, and in which the brushes are caused to move over the entire inner and outer surfaces of the glass during the washing operation.

Still another object is to provide a glass washer employing brushes on the interior and exterior surface of the glass and in which the brushes constitute complete units which can be readily substituted for, or replaced by other units without completely dismantling the washer.

A still further object is to provide a glass washer in which the brush or brushes are caused to reciprocate and simultaneously rotate over the glass by mechanism of readily machineable parts forming a simple mechanical structure.

Another object is to provide a glass washer of the reciprocatory brush type, operated by a downward pressure and in which the translation of hand power from pressure to reciprocation is accomplished with the least amount of friction.

Another object is to provide a glass washer of the combined reciprocatory and rotating brush type, operated by the minimum downward pressure, and with the minimum downward displacement of the stationary glass held by the operator.

The general object of the invention is to im-

2 prove the art of glass washers in providing a device which is highly efficient in operation and completely cleanses and germicides all active surfaces of the glass, bottle or other articles being washed.

The above objects are obtained in brief by providing a rigid vertical stand surrounded by a tubular member which carries the entire brush structure and contains a compression spring. The vertical standard is provided with one or more outwardly extending pins which are slidably received in one or more spiral slots formed in the tubular member. The combination of these slots and pins provide the rotary brush movement when downward pressure is applied to the tubular member, while the compression spring furnishes the reciprocatory action. Inasmuch as the tubular member surrounds the spring, the latter and its immediately associated parts are accorded considerable mechanical protection.

The invention will be better understood when reference is made to the following description and the accompanying drawings in which:

Fig. 1 is a vertical perspective view of the improved washer with a portion of the glass broken away to show the interior brush unit;

Fig. 2 is an elevational view of the same structure as in Fig. 1 except the glass has been removed and some of the parts of the structure are shown in section;

Fig. 3 represents a detail sectional view taken along line 3—3 in Fig. 2;

Fig. 4 is a transverse sectional view of the entire washer taken along line 4—4 in Fig. 1;

Fig. 5 depicts a longitudinal sectional view of the central standard or support member of the improved washer and immediately adjacent parts;

Fig. 6 is a view somewhat similar to Fig. 5 but showing a modified form of the central standard or support member;

Fig. 7 is a fragmentary sectional view of a modified structure including the spiral slots and cooperating pin for reciprocably supporting the brush collar. Fig. 7 is a view taken along line 7—7 in Fig. 8;

Fig. 8 depicts a view, partly in section but mainly in elevation, of the structure shown in Fig. 7 but looking at the structure in a direction 90° removed from that shown in Fig. 7;

Fig. 9 is a sectional view, with some parts in elevation, of a portion of a modified structure for reciprocably supporting the brush element;

Fig. 10 represents still another modified form of a brush supporting structure and in general shows a reversal of parts from that illustrated in Figs. 2, 5, 6, 7 and 9.

Referring more particularly to Figs. 1 and 2, reference character 1 represents a relatively heavy metal base preferably of a dished-out form and containing within the recessed portion a rubber disc or mat 2 which preferably extends beyond the periphery of the base. The outer peripheral surface 3 of the disc serves to provide a suction or vacuum cup effect to hold the base rigidly in position, particularly when the washer is immersed in a germicidal solution.

There is a metal standard or support rod 4 extending upwardly from the central portion of the base, this support being provided at the lower end with a threaded shoulder portion 5 and receives a washer 6 and a nut 7. Thus the disc 2 is securely held in position as well as the upright rod 4. The upper end of the rod terminates in a shouldered extension 8, the purpose of which will be explained hereinafter and just below this extension there is a pair of oppositely disposed tapped holes for receiving headed screws 9 which may conveniently be of the Allen cap screw type.

A tubular member of sleeve 12 of metal, closed at the upper end slidably surrounds the upper end of the rod 4. This member is provided with a pair of oppositely disposed, relatively long, spiral slots 11 which are of a width as snugly but slidably to receive the heads of the screws 9. Within the tubular member 12, there is a compression spring 13 which is seated at the upper end against the flat surface of the member and at the lower end the spring surrounds the extension 8 and seats against the shoulder formed by that extension. It is obvious that when pressure is applied against the tubular member 12 the combined slot and pin structure causes the member to rotate through a partial turn, the spring 13 being momentarily pressed. Upon release of the pressure the member is caused to rotate through a partial turn in the opposite direction and the member moves upwardly due to the action of the spring.

There is a central brush unit or element secured to the member 12, this unit being formed preferably of a solid wood core 14 having a countersunk opening 15 of a diameter as tightly to fit the tubular member 12. The fit of the core 14 to the member 12 is not especially critical as it has been found there is sufficient friction between the wood and the metal as to eliminate slippage between these parts when the member is being rotated. This friction is obviously increased when the wooden core becomes wet and swells. Bristles 16 of any suitable and well known type can be secured to the peripheral surface of the core 14, a convenient way being to provide a helical groove in the core, and when the bristles are formed as loops a metal wire can be wrapped within the groove to hold the bristles in place at the loop portions. The bristles therefore follow the outline of the groove and due to helical configuration they tend to extend slightly upwardly as well as outwardly from the core. In addition to these diametrically positioned bristles, a top-knot of bristles indicated at 17 is also provided at the uppermost end of the core 4. For this purpose the core can be shouldered as indicated at 18, and the lower ends of the bristles are arranged around the shoulder and held in position by a metal wire 19. These top bristles have a natural tendency to flare outwardly so that when a glass 20 is inserted over the brush unit and pressed downwardly the upper bristles will spread out over the entire inner flat surface of the glass 20, as shown in Fig. 1. It is obvious that the side bristles 16 serve to cleanse the inner circumferential surface of the glass so that the brush unit as a whole covers the entire inner surface of the glass.

For cleansing the outer circular surface of the glass, I employ a plurality of longitudinal extending brush elements which are mounted on a carrier, indicated generally at 21. This carrier may comprise a plurality of strips of metal 22 of which three have been illustrated and arranged equidistantly in a circular direction with respect to the tubular member 12. Each metal strip is bent through a 90° angle to form the upright 23 and reenforcing ridges 24 may be provided at the corners. The upright members 23 may take a U-shaped cross-section having flanged sides 25 as indicated in Fig. 3. Each brush unit may comprise a wooden rectangular core having two rows of holes to receive the base portions of the bristles 27, the position of the uprights and contained brushes being such that the bristles 27 project radially inward toward the central brush unit 10. Inasmuch as these uprights 23 are typified as being shown as three in number, the outer brush units are arranged approximately 120° apart. It is preferable that the brush supporting upright 23 be so positioned in the radial direction that the bristles 27 shall extend to a limited distance into the bristles 16 of the central brush unit.

The metal strips 22 are maintained in their respective positions by means of a collared extension 28 provided at the lower end of the member 12, this extension terminating in a threaded sleeve 29. The latter is rotatively received by the rod 4. Each strip 22 is provided with an opening slightly larger than the threaded portion 29 and the strips are arranged on one another against the collar 28 and held in position by a nut 30 which engages the threads on the extension 29. If desired, one or more pins 31 may extend through the three thicknesses of the strips 22 so as to hold these strips in their proper position even when the nut 30 is loosened, or if desired, these strips can be spot welded together.

Thus when the glass 20 is inserted over the central brush unit 10 and pressed downwardly the glass serves to separate in an edgewise direction the side bristles 27 and the central bristles 16 and continued pressure of the glass downwardly will cause the brush unit 10 and also the brush carrier 21 to rotate due to the sliding action of the pins 9 within the slots 11 of the member 12. An opening 30ᵃ may be provided at the top of the tubular member 12 to serve as a vent when the upper end of the rod 4 moves relatively beyond the upper edge of the slots 11 to effect a piston action during this downward movement. As pressure on the glass is released, the compression spring 13 serves to press the tubular member upwardly, and in doing so, causes this member to rotate in a direction opposite from the first movement, thereby re-rotating the brush unit 10 and brush carrier 21. It will be noted that the lowermost bristles 16 of the unit 10 terminate a distance considerably above the lowermost bristles 27 of the side brushes, the reason being that the central bristles will come in line with the side bristles when the central brush unit has been depressed through its maximum distance. It will be noted that a vertical movement is obtained between the central and side brushes as well as a rotary movement so as to obtain highly effective scouring action by the brushes on the inner and outer glass surfaces. By providing a pair of slots 11 at opposite sides of the tubular member together with a pair of pins projecting into the slots, a symmetry of operation is obtained which tends to reduce friction.

The metal parts of the washer can be made of any suitable and relatively inexpensive material but it is preferred that the metal strips 22 forming the outer brush carrier, also the rod 4 be made of stainless steel, or at least chromium plated so as to assist in keeping the parts clean. The tubular member 12 can be made of bronze in order to provide hard wearing edges at the slots. Metals of this character tend to resist corrosion due to chemical effects that may be exerted on the parts by the germicide in the rinsing water.

In addition to providing a highly efficient operating washer for cleansing glasses, crockery and similar ware, one of the important features of my invention relates to the improved way in which the various parts can be assembled, disassembled and replaced, particularly the brushes, as they become worn. It has been pointed out that the wooden core 14 of the central brush is held in frictional engagement with the tubular member 12 and this friction is a sufficient restraining force to hold the parts rigidly in contact because there is not much contact friction between the bristles 16 and the interior of the glass. Consequently, it is possible to pull the wooden core upwardly out of engagement with the member 12, especially when the core is dry and in a shrunken condition in case it is desired to replace the central brush.

I have also provided a unique way and structure for permitting replacement of the side brushes. As shown in Fig. 3, the wooden core or block 26 is of smaller width than the inside dimension between the flanges 25. A countersunk hole 32 may be provided at any suitable position along one of the edges of the block 26 and a fixture 33 of well known type consisting of a spring pressed pin 34 may be pressed into the opening 32. A hole 35 is drilled through the flange 25 directly opposite the pin 34, this hole being of a smaller size than the pin so that only a limited portion of the curved end of the pin registers with the inside edge of the hole. Thus the hole serves to locate the pin with respect to the flange 25 and the block 26 is located longitudinally within the U-shaped upright member 23. Additional pins and registering openings can be employed, if desired, in which case, the block 26 can be moved along the flanges 25 to any predetermined position as long as one of the pins aligns itself with one of the openings in the flanges. Thus, the scouring position of the exterior brushes 27 can be adjusted to accommodate any length of glass. The blocks 26 can obviously be moved upwardly along the uprights to have the pins register with different openings in case it is desired to bring the bristles 27 nearer to the top of the central brush element for washing short glasses.

In case the brush is to be removed from its compartment, a longitudinal pressure exerted at the block 26 will cause the pin 34 to recede out of the opening 35 and the block can be slid out of place. Pressure can also be exerted against the end of the pin, if necessary, through the opening 35 in case the pin should stick. It is evident that the pressure exerted by the pin 34 against the edge of the opening 35 is sufficient to force the block 26 firmly against the inner surface of the flange at the opposite side of the block so that the brush is held rigidly in position. Any downward pressure exerted by the glass 20 during the washing operation is accommodated to a large extent by the flexibility of the bristles 27 and there is little or no tendency to move the block 26 with respect to its compartment.

The brush carrier 21 can also be removed as an entirety from the washer by simply removing the nuts 30 and 7 which would permit the rod 4 to be pulled upwardly out of the base 1 and the carrier could be slid downwardly along the rod. It is apparent that in view of the extreme facility with which the various parts can be removed for inspection or replacement, the washer as a whole can be readily assembled during manufacture. The tubular member 12 can be removed from the rod 4 to which it is effectively pinned by the screws 9 by simply removing these screws through the spiral slots and also the nut 30 from the brush carrier. The strips 22 and the bent up portions 23 together with the flanged portions 25 can be readily formed in standard presses and dies so that the carrier as a whole can be inexpensively made.

Instead of providing two diametrally positioned spiral slots in the tubular member 12, I may instead, still further to reduce expense, provide only one slot and such modification is shown in Fig. 6, the slot being indicated at 11ª. A recess 36 is provided at one side of the rod 4ª opposite the slot and there is a roller 37 of hardened steel contained within the recess. The rod 4ª has an extension 8ª. The roller 37 is rotatably mounted on a rod 38 and held in position by a head 39 of the rod. The roller is located within the slot so that as downward pressure is applied to the tubular member 12, the latter is caused to rotate due to the slidable engagement between the roller and the spiral slot. In order to remove the pin 38 from the rod 4ª so as to disengage the tubular member 12ª from the rod, I may provide a suitably positioned opening 40 which extends through the wall of the member (Fig. 6). When this member is pressed downwardly, the opening 40 can be made to align itself with the unheaded end of the pin 38 and the latter can be removed by a punch inserted in the opening.

In operation the washer is placed in a sink or other large receptacle containing a germicidal solution, the level of the water being preferably such as to immerse all parts of the brushes including the topknot 17 when the latter has been pressed to its fullest extent downwardly. The suction cup 3 will hold the washer rigidly in place and when the glass 20 is inserted between the outer and the inner sets of brushes shown in Fig. 1 and reciprocated several times in the vertical direction, a thorough cleansing of the entire inner surface of the glass and the entire circumferential surface of the glass is obtained. The structure as a whole, apart from the base, is relatively light in weight and the parts are rigidly held in vertical position, particularly by reason of the shoulder 5 and the relatively large washer 6 which gives a large bearing surface at the base.

Figs. 7 and 8 represent a modified form of brush structure. This structure includes the solid standard upright 4ᵇ which terminates in the extension 8ᵇ of smaller diameter for forming a shoulder on which rests the compression spring 13. At a position immediately above the collar 28 there is a transverse opening through the rod 4ᵇ for snugly receiving a pin 39 having shoulders 40 of smaller diameter at each end. The pin portions 40 are loosely received by a pair of spiral slots 11ᵇ positioned on opposite sides of the sleeve 12ᵇ similar to those explained in connection with Fig. 2. In order to insert the pin 39 in position, the lower end of one of the slots is enlarged to a round opening 42 which is sufficiently large to accommodate the pin 39 and the latter can therefore be driven into position from one side of the sleeve.

The collar 14ᵇ of the central brush unit is snugly received by the sleeve 12ᵇ and in this case extends downwardly as far as the collar 28ᵇ so as to slide over the ends of the pin 39 and hold the latter in place in the longitudinal direction. The operation of this device is similar to that described in connection with Figs. 1, 2 and 5 and it will be noted that the pin 39 takes the place of the screws 9 of Fig. 5 in providing a suitable projection which cooperates with the spiral slots for causing the wooden core to rotate when a glass is placed in position between the brushes and pressed downwardly.

In the modification shown in Fig. 9 the sleeve 12ᶜ is provided at its lower end, not only with the threads 29ᶜ but also with a threaded collar 43. This collar is received by internal threads in a bushing 44, preferably of a non-corrodible metal, and the latter is snugly received by a recessed opening 45 in the lower end of the wooden core 14ᶜ. The threads on the collar 43 are preferably left-handed, i. e., in such a direction that when the user, placing a glass 20 over the central brush element and presses downward, the unit and brush carrier turn clockwise, but due to the slight friction between the glass and the central brush there is a tendency for the bushing 44 to tighten up on the collar. Thus the joint between the bushing and the collar will always remain tight except when it is desired to disassemble the parts, in which case the central brush unit and its bushing 45 would be rotated clockwise, holding the brush carrier stationary to disengage the threads from the bushing.

Fig. 10 shows still another modification. In this figure the standard 4ᵈ is made as a tube and extends for a considerable distance into the metal sleeve 12ᵈ with a sliding fit. The compression spring 13ᵈ is contained within the tubular standard 4ᵈ and is supported at the lower end in any suitable manner as by cross pins 46, and at the upper end the spring bears against the interior top surface of the sleeve 12ᵈ. The wooden core 14ᵈ which carries the bristles 16 surrounds the sleeve 12ᵈ with a snug fit and extends downwardly as far as the collar 28ᵈ. There is a pin 47 carried by a pair of openings in the tubular standard and extending transversely thereof. This pin is held in position lengthwise by being contained at their ends within the wooden core 14ᵈ. There is a pair of spiral slots 11ᵈ in the sleeve 12ᵈ which slidably receive the opposite ends of the pin 47. Thus when the wooden core 14ᵈ and its sleeve 12ᵈ are pressed downwardly over the stationary tubular standard 4ᵈ, the opposite ends of the pins are caused to travel upwardly along the two slots and the spring 13ᵈ is placed under compression.

It will be understood that I desire to comprehend within my invention such modifications as come within the scope of the claims and the invention.

Having thus fully set forth and described my invention what I claim as new and desire to secure by Letters Patent is:

1. A glass washer comprising a reciprocable hollow brush element, a tubular member secured within said element, an upright rod for supporting the washer, said tubular member being adapted to be slidably received by said rod, a compression spring in said member, and bearing endwise against said rod, a spiral slot formed in the wall of said member, a pin secured to said rod extending into said slot whereby when the brush element is pressed toward the end of the rod the pin and slot structure cooperate to cause said element to rotate, and when pressure is released from the brush element said structure serves to cause the element to rotate in the opposite direction, and means for detachably securing the brush element to said tubular member, said means serving to tighten the joint between the brush element and said member when the element is rotated in one direction, but to loosen said joint when the element is rotated in the opposite direction.

2. A glass washer comprising a reciprocable hollow brush element, a tubular member secured within said element, an upright rod for supporting the washer, said tubular member being adapted to be slidably received by said rod but leaving a space within the member, a compression spring in said space and bearing endwise against said rod, a spiral slot formed in the wall of said member, and a pin secured to said rod extending into said slot whereby when the brush element is pressed toward the end of the rod the pin and slot structure cooperate to cause the said element to rotate, and when pressure is released from the brush element said structure serves to cause the element to rotate in the opposite direction, and means for securing the brush element to said tubular member, said means comprising a bushing inserted in the end of said element and having internal threads, and a threaded collar on said tubular member within said bushing for threadedly engaging the bushing.

3. A glass washer comprising a reciprocable hollow brush element, a tubular member secured within said element, an upright for supporting the washer, said tubular member being adapted to be slidably received by said upright but leaving a space within the member, a compression spring in said space and bearing endwise against said upright, a spiral slot formed in the wall of said member, and a pin secured to said upright extending into said slot whereby when the brush element is pressed toward the end of the upright the pin and slot structure cooperate to cause said element to rotate, and when pressure is released from the brush element said structure serves to cause the element to rotate in the opposite direction, and means for securing the brush element to said tubular member, said means comprising a bushing inserted in the end of said element and having internal threads, and a threaded collar on said tubular member within said bushing for threadedly engaging the bushing, said threads being of such character that when the brush element is rotated in one direction the effect is to tighten the bushing against the threaded collar of the tubular member.

4. A glass washer comprising a reciprocable hollow brush element, a tubular member secured within said element, an upright for supporting the washer, said tubular member being slidably received by said upright, a compression spring within said member and bearing endwise against said upright, a spiral slot formed in the wall of said member, and a pin secured to said upright extending into said slot whereby when the brush element is pressed toward the end of the upright the pin and slot structure cooperate to cause said element to rotate and when pressure is released from the brush element said structure serves to cause the element to rotate in the opposite direction, means for securing the brush element to said tubular member, said means comprising a bushing inserted in the end of said element and having internal threads, and a threaded collar on said tubular member within said bushing for threadedly engaging the bushing, a brush carrier surrounding said brush element and adapted to support brushes which extend along the central brush element, said carrier being secured to said tubular member, the threads on said threaded collar being of such character that when the brush element and brush carrier are rotated together the effect is to tighten the bushing against the threaded collar of the tubular member, but when the brush element is rotated while holding the brush carrier stationary the effect is to loosen said bushing on the threaded collar of the tubular member whereby the central brush element and the bushing can be removed from the tubular member.

5. An outer brush carrier for a glass washer having a central brush element, said carrier comprising a plurality of metal strips which radiate outwardly from the center of the washer and are bent upwardly in the same general direction as the central brush element of the washer, the upright portions of said strips being formed as U-shaped sections, brushes slidably received within said sections, a plurality of spaced spring-urged pins in each of said brushes and a plurality of openings in the flanges corresponding in position to the position of said pins whereby each brush can be moved along the flanges to one of a plurality of positions in which at least one of the pins will enter one of said openings.

URBAN F. GOCHOEL.

References Cited in the file of this patent

UNITED STATES PATENTS

| Number | Name | Date |
|---|---|---|
| 388,248 | Blair | Aug. 21, 1888 |
| 503,638 | Zauner | Aug. 22, 1893 |
| 717,061 | Witte | Dec. 30, 1902 |
| 832,448 | Beerbower | Oct. 2, 1906 |
| 872,702 | Vodoz | Dec. 13, 1907 |
| 1,153,308 | Ishida | Sept. 14, 1915 |
| 1,603,288 | Nakis | Oct. 19, 1926 |
| 1,735,802 | Statuto | Nov. 12, 1929 |
| 1,837,389 | Albany | Dec. 22, 1931 |
| 1,921,509 | De Forest | Aug. 8, 1933 |
| 2,032,915 | Cunningham | Mar. 3, 1936 |
| 2,056,030 | Wolfe | Sept. 29, 1936 |
| 2,258,895 | Jakubowski | Oct. 14, 1941 |
| 2,571,902 | Lever | Oct. 16, 1951 |